United States Patent [19]

Maeda

[11] Patent Number: 4,833,557
[45] Date of Patent: May 23, 1989

[54] TRANSDUCER SHIFTING DEVICE

[75] Inventor: Masaya Maeda, Kanagawa, Japan

[73] Assignee: Canon Kabushiki Kaisha, Tokyo, Japan

[21] Appl. No.: 111,206

[22] Filed: Oct. 21, 1987

[30] Foreign Application Priority Data

Oct. 23, 1986 [JP] Japan .................. 61-253305

[51] Int. Cl.$^4$ .................. G11B 5/55; G11B 21/08
[52] U.S. Cl. .................. 360/106
[58] Field of Search .................. 360/106

[56] References Cited

U.S. PATENT DOCUMENTS

| | | | |
|---|---|---|---|
| 4,652,952 | 3/1987 | Maeda .................. | 360/106 |
| 4,652,953 | 3/1987 | Sakurai et al. .................. | 360/106 |
| 4,733,315 | 3/1988 | Okuyama et al. .................. | 360/106 |
| 4,747,003 | 5/1988 | Tezuka .................. | 360/106 |
| 4,750,068 | 6/1988 | Akasaki et al. .................. | 360/106 |

Primary Examiner—Robert S. Tupper
Attorney, Agent, or Firm—Robin, Blecker & Daley

[57] ABSTRACT

A carriage shifting device of a recording or reproducing apparatus comprises a transducer which is arranged to perform a recording or reproducing operation on a disc-shaped recording medium, a carriage arranged to shift the transducer along the recording medium, a carriage shifting cam arranged to shift the carriage, a driving gear arranged to drive the cam, a resilient member arranged to exert an urging force between the driving gear and the cam, and a control member arranged to be driven together with the cam and to keep the urging force of the resilient member substantially constant.

24 Claims, 2 Drawing Sheets

TRANSDUCER SHIFTING DEVICE

BACKGROUND OF THE INVENTION

1. Field of the Invention

This invention relates to an apparatus for recording or reproducing a video signal by radially shifting a head on a disc-shaped recording medium (hereinafter referred to as the disc) to form thereby recording tracks either in a concentric circular shape or in a helical shape and more particularly to a method for driving the head carriage of an apparatus of such kind.

2. Description of the Related Art

Recording density is trending upward as a result of the recent advancement of reduction in size of a magnetic disc recording and/or reproducing apparatus. The width and pitch of the recording tracks to be formed on the disc are being set only at some scores of μm. In positioning the head of the apparatus on the disc, therefore, a high degree of precision is required to limit an allowable error of the position of the head relative to the disc to only several μm.

The above stated requirement is particularly severe in the case of the so-called electronic still camera. The standardized diameter of a magnetic disc to be handled by a device incorporated in the camera of that kind is only 47 mm. Since the camera must be compact somewhat like the conventional camera, both the allowable size and the power consumption of the device which includes means for positioning the head are severely limited.

The conventional disc handling devices of this kind have been provided with varied arrangements using a lead screw, a cam, etc. for stepwise feeding of the disc. Most of these devices are arranged to linearly drive a head carriage by driving the lead screw, the cam or the like by means of a drive source such as a stepper motor via a reduction device which has a gear train or the like arranged in relation to the drive source. In this instance a head positioning error results from an engagement play existing in the gear train. To solve this problem, practice has been to to apply to the gears a unidirectional rotation urging force to absorb the play among them.

FIG. 1 of the accompanying drawings shows an example of the conventional methods. The illustration includes a portion of a head carriage 1 which is loaded with a head and is linearly guided in the direction of arrow A. A cam follower pin 1a is erected on the carriage 1 and is in a position to abut on the periphery of a feed cam 2. The head carriage 1 is urged to move to the left as viewed on the drawing by a spring which is not shown. Therefore, the cam follower pin 1a is lightly pushed into resilient contact with the periphery of the feed cam 2.

The feed cam 2 is pivotally carried by a shaft 4 to be rotatable on the shaft 4 and is thus arranged in one unified body with a gear 3. A rotating force of a stepper motor which is not shown is transmitted via a gear 7, etc. to cause the feed cam 2 to turn round at a given angle relative to the rotation angle of the stepper motor. The head carriage 1 is arranged to be linearly shifted in the direction of arrow A accordingly as the feed cam 2 rotates to change the radial position thereof. An engagement-play-absorbing coiled spring 5 is mounted on the periphery of a boss part 3a which is formed in one body with the gear 3. One end of the engagement play absorbing spring 5 is attached to a spring peg 3b erected on the gear 3. The other end of the spring 5 is secured to a chassis which is not shown. The gear 3 which is unified with the feed cam 2 is urged to turn clockwise by the tension of the coiled spring 5 exerted in the direction of arrow B in such a way as to absorb the engagement play in question.

In the case of the above stated arrangement, the feed cam 2 makes about one turn while the head is shifted from its outermost position to an innermost position on the disc. Accordingly, the tension of the spring 5 changes from a maximum value to a minimum value thereof upon completion of one turn of the cam.

With the device thus arranged to change the one-way pulling force for the purpose of absorbing the engagement play, however, the head positioning precision would still be affected by fluctuations in the head stopping position relative to each phase of the stepper motor in cases that the device is required to have an absolute position accuracy within an error range of only several μm.

In another known method for preventing an engagement play between gears, two gears of the same diameter are arranged one on top of another in the direction of their rotation axis; a spring is arranged between the gears to urge them to turn in opposite directions; and then other gears which transmit a driving force are mounted in a state of engaging the former gears on the same plane. In other words, in accordance with that method, the engagement with other gears prevents the two gears from turning round in the opposite directions. Any play between the gears thus can be absorbed while the driving or rotating force is transmitted with the gears rotating together. In accordance with that method, however, it is always only the play between two gears that is removable. In the event of a driving force transmission system consisting of three or more than three gears, the same arrangement must be made for each pair of engaging gears. In that event, the play between one pair is not the same as the play between another pair of gears and, therefore, it is impossible to remove the engagement plays of the whole driving force transmission system.

Besides, the method necessitates the forming of each gear with two vertically overlapped gears and to provide urging springs between them. The method is, therefore, too complex in structural arrangement and thus also has a shortcoming in terms of workability.

SUMMARY OF THE INVENTION

It is an object of this invention to provide a transducer shifting device which is capable of solving the above stated problems of the prior art and is arranged to accurately shift a transducer.

To attain this object, a transducer shifting device according to this invention comprises: a carriage which carries a transducer and is arranged to be shiftable along a recording medium; positioning means arranged to shift the carriage and to control the shifting position of the carriage; a drive source arranged to drive the positioning means; urging means arranged to exert an urging force between the positioning means and the driving means; and urging force control means arranged to keep the urging force of the urging means substantially constant irrespectively of the shifting position of the carriage. With the device arranged in this manner, the device always eliminates, throughout the whole carriage shifting range, any transducer positioning error otherwise caused by a play and backlash within a driving force transmission system including the transducer shifting positioning means and the drive source by virtue of the urging means and by keeping the urging force of the urging means at an unvarying value.

It is another object of this invention to provide a transducer shifting device wherein the urging force exerted between the carriage and the drive source is arranged not to apply any rotating force to the drive source and not to impose any load on the driving force of the drive source. To attain that object, in accordance with this invention, the urging force exerted between carriage shifting positioning means and the drive means is arranged to be offset by urging force control means.

Further objects and features of this invention will become apparent from the following detailed description of an embodiment thereof taken in connection with the accompanying drawings.

DETAILED DESCRIPTION OF THE PREFERRED EMBODIMENT

Figure 1:
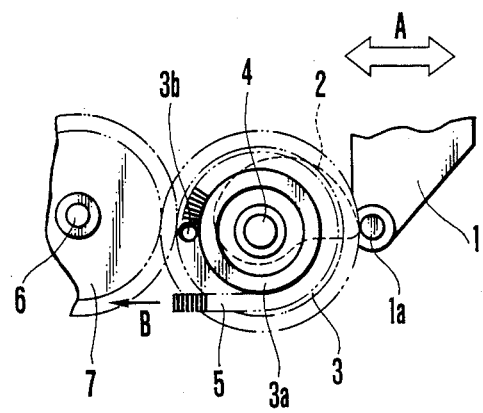
FIG. 1 is a plan view showing by way of example the arrangement around a feed cam of the conventional transducer shifting device.
Figure 3:
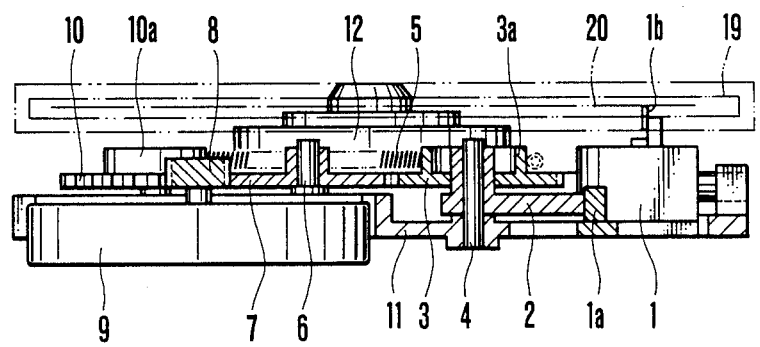
FIG. 3 is a sectional view taken along a line C—C shown in FIG. 2.
Figure 2:
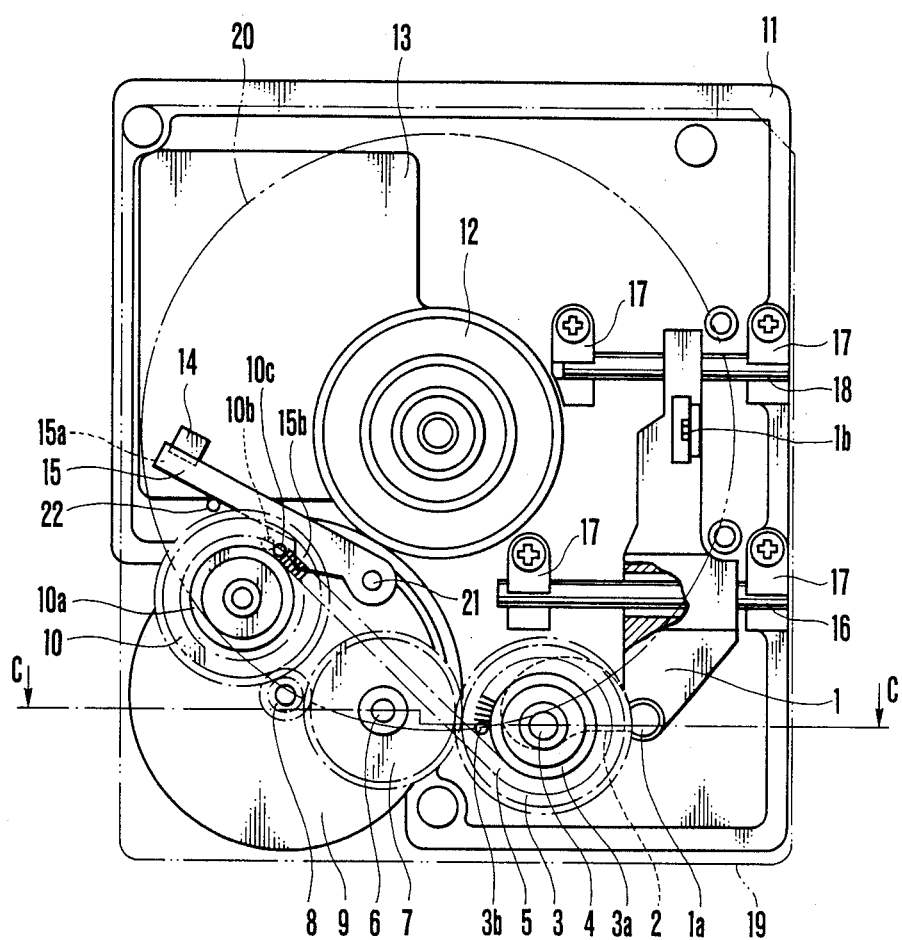
FIG. 2 is a plan view showing an embodiment of this invention.

FIGS. 2 and 3 show an embodiment of this invention. FIG. 2 shows a disc handling device in a plan view. FIG. 3 shows the same device in a sectional view as taken along a line C—C shown in the plan view. With reference to these drawings, the embodiment is described as follows: In FIGS. 2 and 3, the parts performing the same functions as those of the corresponding ones included in the conventional device shown in FIG. 1 are indicated by the same reference numerals. In FIG. 2, a magnetic disc 20 (hereinafter referred to simply as the disc) is placed within a cartridge 19 as shown by two-dot-chain lines respectively. The disc 20 has its middle part chucked to the spindle part of a spindle motor 12 and is thus arranged to rotate together with the spindle motor 12 at a given rotational frequency.

A head carriage 1 is located with a magnetic head 1b and is pivotally carried to be slidable in the direction of the radius of the disc 20 being guided by two guide shafts 16 and 18 which are secured to a body chassis 11 through a fixed member 17. A spring which is not shown is arranged to urge the head carriage 1 to move in the direction of the inner circumference of the disc 20, i.e. in the direction in which a cam follower pin 1a comes to abut on a feed cam 2 as shown in FIG. 2. The spindle motor 12 is disposed at about the middle part of the body chassis 11 of the device. A stepper motor 9 which is provided for driving the head is attached to the lower left corner of the chassis 11 also as viewed on FIG. 2. A pinion gear 8 is secured to the rotating shaft of the stepper motor 9. The gear 8 engages an intermediate gear 7 which is pivotally carried by and rotatable on a shaft 6 secured to the body chassis 11. The gear 7 engages a gear 3 which rotates together with the feed cam 2.

Like in the case of the conventional device mentioned in the foregoing, a spring 5 for absorbing an engaging play or backlash is wound the periphery of a boss part 3a which is formed in one body with the gear 3 as shown in FIG. 2. One end of the spring 5 is attached to a spring peg 3b provided on a gear 3. The spring 5 has the other end of the spring attached to a spring peg 10c provided on a head position detecting gear 10 and is arranged to be wound around the boss part 10a of the bear 10. The spring 5 is stretched out to have a suitable tension for absorbing the engaging play of the group or train of gears mentioned in the foregoing. The gears 3 and 10 to which the two ends of the spring 5 are attached and are arranged to be driven by the stepper motor 9 are arranged to be in about the same reduction ratio to the stepper motor 9. Therefore, the stretching degree of the spring 5 little changes and, accordingly, the tension also remains unchanged while the head 1b is shifted from the outermost position to the innermost position relative to the disc 20, i.e. while the feed cam 2 makes about one turn. Therefore, in accordance with the arrangement of this embodiment, the one-way pulling force exerted by the spring 5 for the purpose of absorbing the engagement play is almost constant irrespectively of the head position, i.e. the rotating position of the cam 2.

Further, as obvious from the drawings, a rotating force applied to the pinion gear 8 mounted on the rotating shaft of the stepper motor 9, that is, the rotating force exerted by the tension of the spring 5 on the pinion gear 8 via the gears 7 and 10 remains about the same in both of two opposite directions. In other words, with the gears 3, 7 and 10 arranged to have the same number of teeth, the rotating force is arranged to be exerted by the tension of the spring 5 on the pinion gear 8 counterclockwise and clockwise via the gear 10 and the gear 3 respectively and at about equal magnitudes, if the diameters of the boss parts 3a and 10a of the gears 3 and 10 are equal to each other.

In cases where the disc handling device is to be mounted on an electronic still camera or the like, the allowable power consumption is severely limited. When the head is not moving, therefore, the head carriage is held in place preferably solely by means of a torque remaining at the stepper motor itself without allowing any holding current to flow for the stepper motor. However, the residual torque of the stepper motor is very small and not enough to hold the head carriage against the one-way rotating force of such play- or backlash-absorbing arrangement that is employed in the conventional device shown in FIG. 1 and thus the motor tends to rotate. Whereas, in the case of this embodiment, the pinion gear 8 is arranged to be under about equal forces exerted in the counterclockwise and clockwise directions through the gears 10 and 3. Therefore, when the head is not being shifted, the two forces offset each other to enable the residual torque to keep the head carriage in place without aid.

Further, a lever 15 is pivotally carried by and is rotatable on a shaft 21 which is erected on the body chassis 11. The lever 15 is provided with a reflection plate 15a at its one end of the reverse side thereof or, on the reverse side of the paper as viewed on FIG. 2. The plate 15a correlates with a photo reflector 14 which is mounted on a coil substrate 13 provided for the spindle motor 12. The lever 15 is urged to turn counterclockwise as viewed on FIG. 2 by means of a spring which is not shown. The urging force thus keeps the lever 15 at rest in a state of abutting on a stopper 22 which is erected on the body chassis 11. The lever 15 is provided for detecting a reference track position. In the case of the embodiment shown in FIG. 2, the lever 15 is arranged to detect the reference track position at an inner peripheral position. The operation of the device is as described below:

In case that the head 1b is located in the outer peripheral area as shown in FIG. 2 before initialization of the system, that is, before a power supply is switched on, the stepper motor 9 rotates clockwise after the power supply is switched on. The clockwise rotation of the stepper motor 9 causes the feed cam 2 via the intermediate gear 7 to turn in the clockwise direction. This in turn causes the head carriage 1 to move toward the inner circumferential side of the disc. At the same time, the head position detecting gear 10 turns in the counterclockwise direction. Then a pin 10b which is provided on the reverse side of the gear 10, i.e. on the reverse side of the paper as viewed on FIG. 2, comes to abut on a projection 15b which is provided on the lever 15 when the head 1b comes to a reference track located in the inner peripheral area. The lever 15 then turns in the clockwise direction. The clockwise turn of the lever 15 brings the reflection plate 15a of the fore end of the lever 15 into a position to confront the photo reflector 14 which is disposed on the coil substrate 13. The photo reflector 14 then produces a signal output.

The reference track position is detected through this signal output. More specifically, a counter disposed within the device is reset thus to correlate the position of the counter to that of the head. After that, the head position control is performed through the counter.

In accordance with the arrangement of the embodiment of this invention, the above stated engagement-play-absorbing spring 5 is stretched between the gear 3 which is arranged to turn together with the feed cam 2 and the gear 10 which is provided for detecting the position of the reference track. This arrangement of the spring 5 not only serves to absorb the engagement play of the feed cam 2 but also that of the reference track position detecting gear 10. It thus gives an advantageous effect.

In the embodiment described, a cam is used as head carriage driving means. However, it is apparent that a similar arrangement is also advantageously applicable to cases where a lead screw is to be driven so long as a gear train is interposed in between the drive source and the head carriage driving means.

In the disc handling device, as described in the foregoing, the spring is arranged for the two gears of the gear train interposed in between the head carriage driving means and the drive source in such a manner that the stretched length of the spring remains almost constant while the gears are rotated. Therefore, the engagement play or engagement-backlash-removing one-way pulling force is unvarying. This enhances precision in positioning the head carriage. Further, with the one-way pulling forces arranged to be constant in magnitude and to be exerted in opposite directions in relation to such drive source as the motor, the head carriage can be kept in position by a relatively weak holding force such as the residual torque of the stepper motor when no power supply is effected to the stepper motor. Further, when the engagement play removing spring stretched between the head carriage driving means such as the cam or a lead screw or the like and the gear having the reference-track-position detecting means in the above stated manner, the engagement play or backlash between the head positioning part and the reference track position detecting part both of which are required to have a high degree of precision can be effectively eliminated with a single spring.

Further, in the case of the embodiment described, the gears 3, 7 and 10 are arranged to have the same number of teeth and the boss parts 3a and 10a arranged to be of the same diameter for keeping the length, or tension, of the spring 5 unvarying. In cases where the number of these gears cannot be equally set, however, the tension of the spring 5 can be kept unvarying by suitably changing the diameters or shapes of the boss parts. In other words, the arrangement of the embodiment may be variously modified in any suitable manner so long as the one-way pulling force can be kept constant or so long as any rotating force can be offset at the driving gear and thus prevented from being exerted on the driving gear.

What is claimed is:

1. A transducer shifting device comprising:
   (a) a carriage arranged to carry a transducer and to be shiftable along a recording medium;
   (b) positioning means arranged to shift said carriage and to control the shifting position of said carriage;
   (c) a drive source arranged to drive said positioning means;
   (d) urging means arranged to exert an urging force between said positioning means and said driving means; and
   (f) urging force control means arranged to keep said urging force of said urging means substantially constant irrespectively of the shifting position of said carriage.

2. A device according to claim 1, wherein said positioning means includes a plurality of gears to which a driving force is transmitted from said drive source; said urging means includes a resilient member interposed in between two of said plurality of gears; and said urging force control means is arranged to keep a resilient force of said resilient member exerted between said gears substantially constant while said gears approximately make one turn.

3. A device according to claim 2, wherein said two gears are arranged to rotate in association with the rotating shaft of a driving motor which is employed as said drive source; and said resilient member is arranged to have the urging force thereof offset by the rotating shaft of said driving motor.

4. A device according to claim 3, wherein said two gears are arranged to receive said driving force through transmission routes discretely arranged in relation to the rotating shaft of said driving motor respectively.

5. A device according to claim 3, wherein said urging means is a coiled spring interposed in between said two gears; and said urging force control means is arranged to keep said coiled spring at a substantially constant length.

6. A device according to claim 4 or 5, wherein said two gears are arranged to rotate in directions opposite to each other.

7. A device according to claim 5, wherein said two gears are respectively provided with bosses; two end portions of said coiled spring are respectively wound round said bosses; and the length of said coiled spring is arranged to be substantially constant within a period during which said two gears approximately make one turn.

8. A device according to claim 2 or 5, further comprising a detecting member which is arranged to detect the position of the transducer by moving along with said carriage, and wherein one of said two gears is arranged to shift said carriage while the other is arranged to operate said detecting member.

9. A device according to claim 2 or 5, wherein one of said two gears is provided with a carriage shifting cam which is arranged to constantly engage a cam follower formed in a part of said carriage; and said carriage is arranged to be shifted by the rotation of said cam.

10. A recording or reproducing apparatus for performing a recording or reproducing operation on a rotating recording medium by radially shifting a transducer relative to said medium, comprising:
 (a) a carriage for carrying said transducer, said carriage being radially shiftable relative to said medium;
 (b) positioning means arranged to control the shifting position of said carriage;
 (c) a drive source arranged to drive said positioning means; and
 (d) urging means for exerting an urging force between said positioning means and said drive source, said urging force being arranged to be substantially constant irrespectively of the position of said positioning means.

11. An apparatus according to claim 10, wherein said positioning means includes a plurality of gears which are arranged to receive driving force from said drive source; said urging means includes a resilient member which is interposed in between two of said plurality of gears; and said resilient member is arranged to have the urging force thereof which is exerted between said gears remain substantially constant within a period during which said gears rotate to a predetermined degree.

12. An apparatus according to claim 11, wherein said two gears are arranged to rotate in association with the rotating shaft of a driving motor which is employed as said drive source; and said resilient member is arranged to have the urging force thereof offset by said rotating shaft of said driving motor.

13. An apparatus according to claim 12, wherein said two gears are arranged to receive the driving force of said driving motor through different routes which are arranged discretely from each other for said rotating shaft of said driving motor.

14. An apparatus according to claim 12, wherein said resilient member is a coiled spring interposed in between said two gears and is arranged to have the length thereof remain substantially constant within a period during which said two gears rotate to a predetermined degree.

15. An apparatus according to claim 13 or 14, wherein said two gears are arranged to rotate in directions opposite to each other.

16. An apparatus according to claim 14, wherein said two gears are respectively provided with bosses; two end portions of said coiled spring are respectively wound round said bosses; and the length of said coiled spring is arranged to remain substantially constant within a period during which said two gears rotate to a given degree.

17. An apparatus according to claim 11 or 14, further comprising a detecting member which is arranged to detect the position of said transducer by moving along with said carriage,
 and wherein one of said two gears is arranged to shift said carriage and the other to operate said detecting member.

18. An apparatus according to claim 11 or 14, wherein one of said two gears is provided with a carriage shifting cam which is arranged to constantly engage a cam follower formed in part of said carriage; and said carriage is arranged to be shifted by the rotation of said cam.

19. A recording or reproducing apparatus for performing a recording or reproducing operation on a rotating recording medium by radially shifting a transducer relative to said medium, comprising:
 (a) a carriage for carrying said transducer, said carriage being radially shiftable relative to said medium;
 (b) positioning means arranged to control the shifting position of said carriage;
 (c) a drive source arranged to drive said positioning means;
 (d) detecting means for detecting the position of said transducer, said detecting means being arranged to be shifted by said drive source in association with the driving operation of said drive source performed on said positioning means; and
 (e) urging means interposed in between said positioning means and said detecting means, said urging means being arranged to exert respectively on said positioning means and said detecting means an urging force which is substantially constant irrespectively of the shifted position of said carriage.

20. An apparatus according to claim 19, wherein said positioning means includes a first gear which is arranged to be driven by said drive source to shift said carriage; said detecting means includes a secnd gear which is also arranged to be driven by said drive means; said urging means includes a resilient member interposed in between said first and second gears; and said resilient member is arranged to have any change of the urging force thereof that is caused by the rotation of said first gear compensated for by the rotation of said second gear, so that the urging force of said resilient member can be kept substantially constant irrespectively of the rotating position of said first gear.

21. An apparatus according to claim 19, wherein said two gears are arranged to rotate in association with the rotation of the rotating shaft of a driving motor which is employed as said drive source; and said resilient member is arranged to have the urging force thereof offset by the rotating shaft of said driving motor.

22. A transducer shifting device comprising:
 (a) a carriage which has a transducer disposed thereon and is shiftable along a recording medium;
 (b) positioning means arranged to control the shifted position of said carriage by shifting said carriage;
 (c) a drive source which is arranged to drive said positioning means;
 (d) urging means for exerting an urging force between said positioning means and said drive source; and
 (e) urging force offsetting means for offsetting such a component of the urging force of said urging means that affects the operation of said drive source.

23. A device according to claim 22, wherein said positioning means includes a first gear which is arranged to receive a driving force form said drive source; said urging means has one end thereof connected to said first gear and is arranged to exert a rotating force on said first gear in a first direction against the driving force of said drive source; said urging force offsetting means includes a second gear which is arranged also to receive a driving force from said drive source and is connected to the other end of said urging force; and said urging means is arranged to exert, against the driving force of said drive source, a rotating force in a second direction which offsets said rotating force exerted in said first direction.

24. A device according to claim 23, wherein said urging means is a resilient member interposed in between said first and second gears; and any change that is caused by the rotation of said first gear in the position of said resilient member is arranged to be compensated for by the rotation of said second gear in such a way as to have the length thereof always kept substantially constant.

* * * * *